(12) United States Patent
Matusik et al.

(10) Patent No.: US 10,994,490 B1
(45) Date of Patent: May 4, 2021

(54) CALIBRATION FOR ADDITIVE MANUFACTURING BY COMPENSATING FOR GEOMETRIC MISALIGNMENTS AND DISTORTIONS BETWEEN COMPONENTS OF A 3D PRINTER

(71) Applicant: Inkbit, LLC, Medford, MA (US)

(72) Inventors: Wojciech Matusik, Lexington, MA (US); Aaron Weber, Arlington, MA (US); Desai Chen, Arlington, MA (US); Harrison Wang, New York, NY (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/944,839

(22) Filed: Jul. 31, 2020

(51) Int. Cl.
| | |
|---|---|
| *B29C 64/386* | (2017.01) |
| *B29C 64/393* | (2017.01) |
| *B29C 64/209* | (2017.01) |
| *G06T 7/80* | (2017.01) |
| *G06T 3/00* | (2006.01) |
| *B29C 64/245* | (2017.01) |
| *B33Y 50/02* | (2015.01) |

(52) U.S. Cl.
CPC .......... *B29C 64/393* (2017.08); *B29C 64/209* (2017.08); *B29C 64/245* (2017.08); *G06T 3/0006* (2013.01); *G06T 7/85* (2017.01); *B33Y 50/02* (2014.12)

(58) Field of Classification Search
CPC .................................................. B28C 64/386
USPC .......................................................... 700/98
See application file for complete search history.

(56) References Cited

U.S. PATENT DOCUMENTS

| | | | |
|---|---|---|---|
| 5,460,758 | A | 10/1995 | Langer et al. |
| 6,492,651 | B2 | 12/2002 | Kerekes |
| 9,562,759 | B2 | 2/2017 | Vogler et al. |
| 9,952,506 | B2 | 4/2018 | Arai et al. |
| 10,011,071 | B2 | 7/2018 | Batchelder |
| 10,252,466 | B2 | 4/2019 | Ramos et al. |
| 10,456,984 | B2 | 10/2019 | Matusik et al. |
| 2002/0104973 | A1 | 8/2002 | Kerekes |
| 2004/0173946 | A1 | 9/2004 | Pfeifer et al. |
| 2007/0106172 | A1 | 5/2007 | Abreu |
| 2007/0241482 | A1 | 10/2007 | Giller et al. |
| 2008/0124475 | A1 | 5/2008 | Kritchman |
| 2009/0073407 | A1 | 3/2009 | Okita |
| 2009/0105605 | A1 | 4/2009 | Abreu |

(Continued)

FOREIGN PATENT DOCUMENTS

| | | |
|---|---|---|
| EP | 3459716 A1 | 3/2019 |
| JP | 2014098555 A | 5/2014 |

(Continued)

OTHER PUBLICATIONS

Alarousu, Erkki, Ahmed AlSaggaf, and Ghassan E. Jabbour. "Online monitoring of printed electronics by spectral-domain optical coherence tomography." Scientific reports 3 (2013): 1562.

(Continued)

*Primary Examiner* — Suresh Suryawanshi
(74) *Attorney, Agent, or Firm* — Occhiuti & Rohlicek LLP (57) ABSTRACT

A method for additive fabrication includes determining numerical calibration transforms for calibrating an imaging sensor and a printhead assembly to a common coordinate system, where at least some of the numerical calibration transforms include nonlinear transforms.

15 Claims, 6 Drawing Sheets

(56) References Cited

U.S. PATENT DOCUMENTS

| | | |
|---|---|---|
| 2009/0220895 A1 | 9/2009 | Garza et al. |
| 2009/0279089 A1 | 11/2009 | Wang |
| 2009/0279098 A1 | 11/2009 | Ohbayashi et al. |
| 2010/0140550 A1 | 6/2010 | Keller et al. |
| 2010/0158332 A1 | 6/2010 | Rico et al. |
| 2012/0275148 A1 | 11/2012 | Yeh et al. |
| 2013/0182260 A1 | 7/2013 | Bonnema et al. |
| 2013/0328227 A1 | 12/2013 | Mckinnon et al. |
| 2014/0249663 A1 | 9/2014 | Voillaume |
| 2014/0300676 A1 | 10/2014 | Miller et al. |
| 2015/0061178 A1 | 3/2015 | Siniscalchi et al. |
| 2015/0101134 A1 | 4/2015 | Manz et al. |
| 2015/0352792 A1 | 12/2015 | Kanada |
| 2016/0018404 A1 | 1/2016 | Iyer et al. |
| 2016/0023403 A1* | 1/2016 | Ramos ............... B29C 64/393 264/40.1 |
| 2016/0101568 A1 | 4/2016 | Mizes et al. |
| 2016/0157751 A1 | 6/2016 | Mahfouz |
| 2016/0167301 A1 | 6/2016 | Cole et al. |
| 2016/0209319 A1 | 7/2016 | Adalsteinsson et al. |
| 2016/0249836 A1 | 9/2016 | Gulati et al. |
| 2016/0320771 A1 | 11/2016 | Huang |
| 2016/0347005 A1 | 12/2016 | Miller |
| 2017/0021455 A1 | 1/2017 | Dallarosa et al. |
| 2017/0106604 A1 | 4/2017 | Dikovsky et al. |
| 2017/0120337 A1 | 5/2017 | Kanko et al. |
| 2017/0143494 A1 | 5/2017 | Mahfouz |
| 2017/0217103 A1 | 8/2017 | Babaei et al. |
| 2017/0355147 A1 | 12/2017 | Buller et al. |
| 2018/0017501 A1 | 1/2018 | Trenholm et al. |
| 2018/0056582 A1 | 3/2018 | Matusik et al. |
| 2018/0071984 A1 | 3/2018 | Lee et al. |
| 2018/0099333 A1 | 4/2018 | DehghanNiri et al. |
| 2018/0143147 A1 | 5/2018 | Milner et al. |
| 2018/0169953 A1 | 6/2018 | Matusik et al. |
| 2018/0194066 A1 | 7/2018 | Ramos et al. |
| 2018/0273657 A1 | 9/2018 | Wang et al. |
| 2018/0281067 A1* | 10/2018 | Small ............... B33Y 50/02 |
| 2018/0297113 A1 | 10/2018 | Preston et al. |
| 2018/0304549 A1 | 10/2018 | Safai et al. |
| 2018/0311893 A1 | 11/2018 | Choi et al. |
| 2018/0320006 A1 | 11/2018 | Lee et al. |
| 2018/0341248 A1 | 11/2018 | Mehr et al. |
| 2018/0348492 A1* | 12/2018 | Pavlov ............... B29C 64/393 |
| 2019/0077921 A1 | 3/2019 | Eckel |
| 2019/0271966 A1 | 9/2019 | Coffman et al. |
| 2019/0322031 A1 | 10/2019 | Kritchman |
| 2019/0329322 A1* | 10/2019 | Preston ............... B29C 64/386 |
| 2019/0346830 A1 | 11/2019 | de Souza Borges Ferreira et al. |
| 2019/0353767 A1 | 11/2019 | Eberspach et al. |
| 2020/0143006 A1 | 5/2020 | Matusik et al. |
| 2020/0147888 A1 | 5/2020 | Ramos et al. |
| 2020/0215761 A1* | 7/2020 | Chen ............... B29C 64/112 |

FOREIGN PATENT DOCUMENTS

| | | |
|---|---|---|
| JP | 2018103488 A | 7/2018 |
| KR | 101567281 B1 | 11/2015 |
| KR | 20180067961 A | 6/2018 |
| WO | 2003/026876 A2 | 4/2003 |
| WO | 2017066077 A1 | 4/2017 |
| WO | 2018080397 A1 | 5/2018 |
| WO | 2018197376 A1 | 11/2018 |
| WO | 2018209438 A1 | 11/2018 |
| WO | 2019070644 A2 | 4/2019 |
| WO | 2019125970 A1 | 6/2019 |
| WO | 2020123479 A1 | 6/2020 |

OTHER PUBLICATIONS

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

Blanken, Lennart. "Learning and repetitive control for complex systems: with application to large format printers." (2019).

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

DebRoy, T.; Wei, H.L.; Zuback, J.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).

Fischer, Björn, Christian Wolf, and Thomas Halting. "Large field optical tomography system." In Smart Sensor Phenomena, Technology, Networks, and Systems Integration 2013, vol. 8693, p. 86930P. International Society for Optics and Photonics, 2013.

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Klein, Thomas, and Robert Huber. "High-speed OCT light sources and systems." Biomedical optics express 8, No. 2 (2017): 828-859.

Kulik, Eduard A., and Patrick Calahan. "Laser profilometry of polymeric materials." Cells and Materials 7, No. 2 (1997): 3.

Moon, Sucbei, and Dug Young Kim. "Ultra-high-speed optical coherence tomography with a stretched pulse supercontinuum source." Optics Express 14, No. 24 (2006): 11575-11584.

Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.

Qi, X.; Chen, G.; Li, Y.; Cheng, X.; and Li, C., "Applying Neural-Network Based Machine Learning to Addirive Manufacturing: Current Applications, Challenges, and Future Perspectives", Jul. 29, 2019, Engineering 5 (2019) 721-729. (Year: 2019).

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted plafform for multi-material 3D printing." ACM Transactions on Graphics (TOG) 34, No. 4 (2015): 129.

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Zhou, Chao, Aneesh Alex, Janarthanan Rasakanthan, and Yutao Ma. "Space-division multiplexing optical coherence tomography." Optics express 21, No. 16 (2013): 19219-19227.

Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

\* cited by examiner

CALIBRATION FOR ADDITIVE MANUFACTURING BY COMPENSATING FOR GEOMETRIC MISALIGNMENTS AND DISTORTIONS BETWEEN COMPONENTS OF A 3D PRINTER

BACKGROUND OF THE INVENTION

This invention relates to calibration of an additive manufacturing system.

Additive manufacturing is a set of methods that allows objects to be fabricated via selective addition of material. A typical additive manufacturing process works by slicing a digital model (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

Inkjet 3D printing is a method of additive manufacturing where printheads deposit droplets of printable material, also called ink. Printheads are typically mounted on a gantry system to allow deposition of printable liquid matrix material in different locations of the build volume. A build platform may also move with respect to the printheads, which may be stationary. The printable liquid matrix material is solidified using UV or visible-light radiation.

Multiple printheads may be used in one system in order to build objects with multiple base materials. For example, materials that have different optical, mechanical, thermal, electromagnetic properties can be used. These materials can be combined to achieve composite materials with a wide range of material properties.

SUMMARY OF THE INVENTION

Aspects described herein relate to an additive manufacturing system that fabricates three-dimensional (3D) objects. In a feedback arrangement of such a system, a layer of material is deposited on a build platform using an actuator (e.g., one or more printheads/inkjet nozzles) and then a scanner measures the deposited layer to determine an estimate of the surface depth of the deposited layer. A desired thickness of one or more subsequent layers to be deposited after scanning is determined from the estimate of the surface depth and a model of the object that is being fabricated.

One source of inaccuracy in the additive fabrication process arises from a lack of geometric calibration of the various components in the additive manufacturing system. For example, the build platform may be rotated and/or translated from its expected position relative to one or both of the scanner and the actuator, such that deposited material and scan data are affected by a linear calibration error. Furthermore, some types of scanners (e.g., laser profilometers) may introduce nonlinear geometric calibration errors into (e.g., due to lenses used in the scanners).

Aspects described herein geometrically calibrate the additive manufacturing system such that the actuator and the scanner operate in a common coordinate system (e.g., the physical coordinate system of the build platform). In some examples, the geometric calibration determines two transforms: 1) a linear transform that maps a coordinate system associated with the actuator to the common coordinate system, and 2) a combined linear and nonlinear transform that maps a coordinate system associated with the scanner to the common coordinate system. The two transforms are used to reduce or eliminate printing and scanning errors due to geometric misalignments and distortions of the elements in the additive manufacturing system.

In a general aspect, a method for additive fabrication includes sensing a first object using an imaging device of an additive fabrication system to determine sensed spatial characteristics of the first object represented in a first coordinate system, determining first numerical configuration information, including determining a relationship between the first coordinate system and a common coordinate system from a relationship of known spatial characteristics of the first object and the sensed spatial characteristics of the first object, the first numerical configuration information including a representation of a nonlinear relationship between the known spatial characteristics of the first object and the sensed spatial characteristics of the first object, fabricating a second object on a build platform of the additive fabrication system, including operating a printhead assembly of the additive fabrication system to deposit material forming the second object to have one or more known spatial characteristics represented in a second coordinate system, sensing the second object after fabrication using the imaging device configured according to the first numerical configuration information to determine sensed spatial characteristics of the second object represented in the common coordinate system, determining second numerical configuration information, including determining a relationship between the second coordinate system and the common coordinate system from a relationship of the known spatial characteristics of the second object and the sensed spatial characteristics of the second object in the common coordinate system, and configuring the additive fabrication system using one or both of the first numerical configuration information and the second numerical configuration information for fabrication of one or more objects according to models of said objects.

Aspects may include one or more of the following features.

The method may include fabricating a third object on a second build platform using the configured additive fabrication system. The first object may include the build platform. The first object may include a calibration pattern. The calibration pattern may include a grid pattern. The known spatial characteristics of the second object may include a known three-dimensional structure. The known three-dimensional structure may include a grid structure. The common coordinate system may be a physical coordinate system.

Determining the first numerical configuration information may include determining a representation of a spatial mapping between the first coordinate system and the common coordinate system. Determining the representation of the spatial mapping may include determining an affine transformation. Determining the representation of the spatial mapping may include determining at least one of a relative position and a relative orientation of the first object and the imaging device.

The printhead assembly may include a number of printheads and determining the second numerical configuration information may include determining relationships between the common coordinate system and coordinate systems associated with respective printheads of the printhead assembly. The imaging device may include a number of imaging devices, and determining the first numerical configuration information, may include determining relationships between the common coordinate system and coordinate systems associated with respective printheads of the printhead assembly.

Determining the second numerical configuration information may further include determining directions of controllable relative motion of the build platform and the printhead assembly. Fabricating the second object may include controlling the relative motion of the build platform relative to the printhead assembly according to the determined directions.

Aspects may have one or more of the following advantages.

Among other advantages, aspects described herein automatically determine a geometric calibration for an additive manufacturing system. This is an improvement over conventional scenarios where geometric calibration of additive manufacturing systems is a manual process. For example, a conventional geometric calibration process requires printing different calibration patterns and manually aligning the fabrication heads. Correcting of geometric distortions is also typically handled by manual measurements of different calibration targets. In general, calibration of additive manufacturing systems relies of high precision/accuracy of mechanical components. Aspects described herein advantageously obviate the need for such manual processes.

Aspects are advantageously able to align any number of printheads/jets, scanners, and other components in a printer to a common coordinate system (e.g., the coordinate system of the build platform). Aspects also allow for transforming the print data to operate in the coordinate system of the build platform.

Aspects can advantageously be used in additive manufacturing printer systems that don't include scanners and in scanner systems that are not part of an additive manufacturing printer system.

Other features and advantages of the invention are apparent from the following description, and from the claims.

DETAILED DESCRIPTION

1 General System Overview

This application is related to a jetting-based 3D printer 100 that is configured to identify and compensate for geometric misalignments and distortions that may exist between the various components of the printer (e.g., printheads, a build platform, an optical scanning system). Very generally, the printer 100 does so by determining, in a calibration configuration, transforms that map different coordinate systems associated with at least some of the components of the printer to a common physical coordinate system (e.g., a coordinate system of the build platform). In a runtime configuration, the printer 100 uses the determined transforms to map data associated with its printing process (e.g., model data and scan data) to the common coordinate system, thereby compensating for the geometric misalignments and distortions between the components of the printer 100.

2 Runtime Configuration

Figure 1:
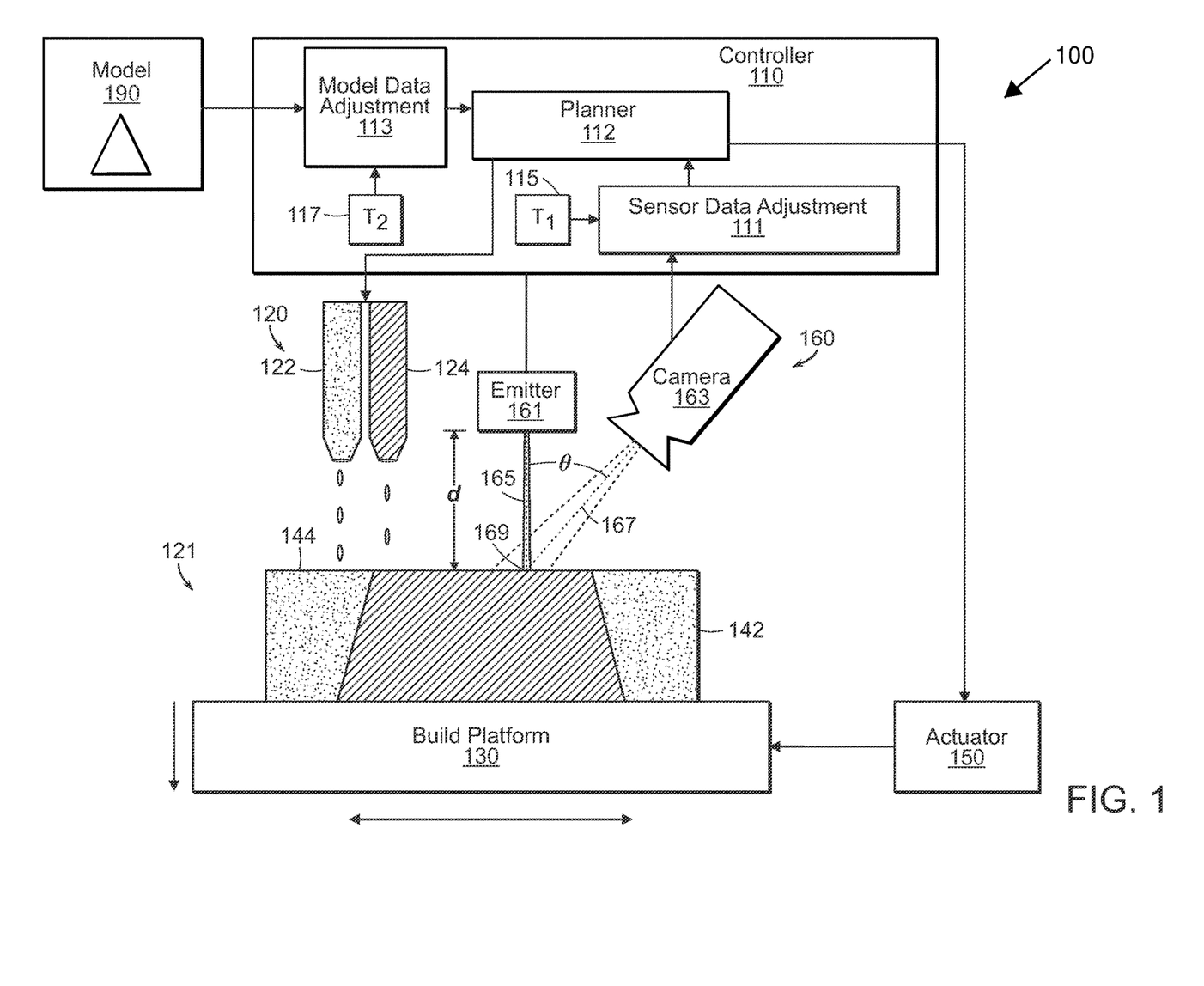
FIG. 1 is an exemplary additive fabrication system.

Referring to FIG. 1, the printer 100 is configured in the runtime configuration. The printer 100 includes printheads/jets 120 (inkjets) configured to emit material for deposition of layers on a partially fabricated object 121. The object is fabricated on a build platform 130, which is controlled to move related to the jets (i.e., along an x-y plane) in a raster-like pattern to form successive layers, and in this example also to move relative to the jets (i.e., along a z-axis) to maintain a desired separation of the jets and the surface of the partially-fabricated object 121. As illustrated, there are multiple jets 122, 124, with one jet 122 being used to emit a support material to form a support structure 142 of the object, and another jet 124 being used to emit built material to form the object 144 itself. For materials for which curing is triggered by an excitation signal, such as an ultraviolet illumination, a curing signal generator (not shown, e.g., a UV lamp) triggers curing of the material shortly after it is jetted onto the object. In other embodiments, multiple different materials may be used, for example, with a separate jet being used for each material. Yet other implementations do not necessarily use an excitation signal (e.g., optical, RF, etc.) and rather the curing is triggered chemically, for example, by mixing multiple components before jetting, or jetting separate components that mix and trigger curing on the object. Note that in some examples, after the additive deposition is complete, the object may be subject to further curing (e.g., to complete the curing), for example, by further exposing the object to UV radiation.

A scanner 160 is positioned above the object under fabrication 121 and is used to determine physical characteristics of the partially fabricated object. For example, the scanner 160 measures the surface geometry (e.g., a depth map characterizing the depth of the partially fabricated object) of the object. Very generally, the measurements from the scanner 160 are associated with a three-dimensional (i.e., x, y, z) coordinate system where the x and y axes are treated as spatial axes in the plane of the build surface and the z axis is a height axis (i.e., growing as the object is fabricated).

While various types of sensing can be used, in the examples described herein, the scanner 160 is a triangulation-based laser profilometer that includes a laser emitter 161 and a camera 163 arranged in a known geometric configuration. To determine a depth profile for a surface region 169, the laser emitter 161 emits a laser line (also extending into the page in FIG. 1) along an emission axis 165 onto the surface region. The laser line reflects from the surface region 169 to the camera 163 along a reflection axis 167. An angle, $\theta$ is formed between the emission axis 165 and the reflection axis 167 and changes based on a distance, d between the surface region and the laser emitter. As such, changes in the angle, $\theta$ are used to determine, by triangulation, a depth profile for the surface region along the laser line.

In some examples, in the context of a digital feedback loop for additive manufacturing, the additive manufacturing system builds the object by printing layers. The scanner 160 captures 3D scan information after the system 100 prints one or more layers. For example, the scanner 160 scans the partial object (or empty build platform), then the printer prints a layer (or layers) of material. Then, the scanner 160 scans the (partially built) object again. The new depth sensed by the scanner 160 should be at a distance that is approximately the old depth minus the thickness of layer (this assumes that the scanner 160 is positioned on the top of the of the object being built and the object is being built from the bottom layer to the top layer and the distance between the scanner 160 and the build platform is unchanged).

A controller 110 includes a planner 112 that uses a model 190 of the object to be fabricated and sensor data from the scanner 160 to determine a print plan (not shown). The planner 112 controls motion of the build platform 130 using a motion actuator 150 (e.g., providing three degrees of motion) and controls the emission of material from the jets 120 according to the print plan.

As is mentioned above, geometric misalignments and distortions may exist between the various components of the printer 100. For example, the build planform 130 may be rotated and/or translated from its expected position relative to the jets 120 and/or the scanner 160. The different jets 122, 124 may be rotated or translated relative to each other. The scanner 160 may introduce nonlinear distortion due to, for example, its use of lenses. To compensate for the geometric misalignments and distortions, the controller 110 uses calibration transforms to adjust print data (e.g., sensor data and model data). For example, the controller 110 includes a scanner data adjustment module 111 that is configured according to a first calibration transform, $T_1$ 115 and a model data adjustment module 113 that is configured according to a second calibration transform, $T_2$ 117.

Very generally, the scanner data adjustment module 111 receives scanner data from the scanner 160 and transforms the scanner data into a "common" coordinate system (e.g., a physical cartesian coordinate system associated with the build platform 130) using the first calibration transform, $T_1$ 115. The model data adjustment module 113 receives the model data 190 and transforms the model data 190 into the "common" coordinate system using the second calibration transform, $T_2$ 117 (or an inverse of the second calibration transform, $T_2^{-1}$).

The transformed scanner data output from the scanner data adjustment module 111 and the transformed model data output from the model data adjustment module 113 are provided to the planner 112, which uses the adjusted data to determine the print plan, as is described above.

3 Calibration Configuration

Figure 2:
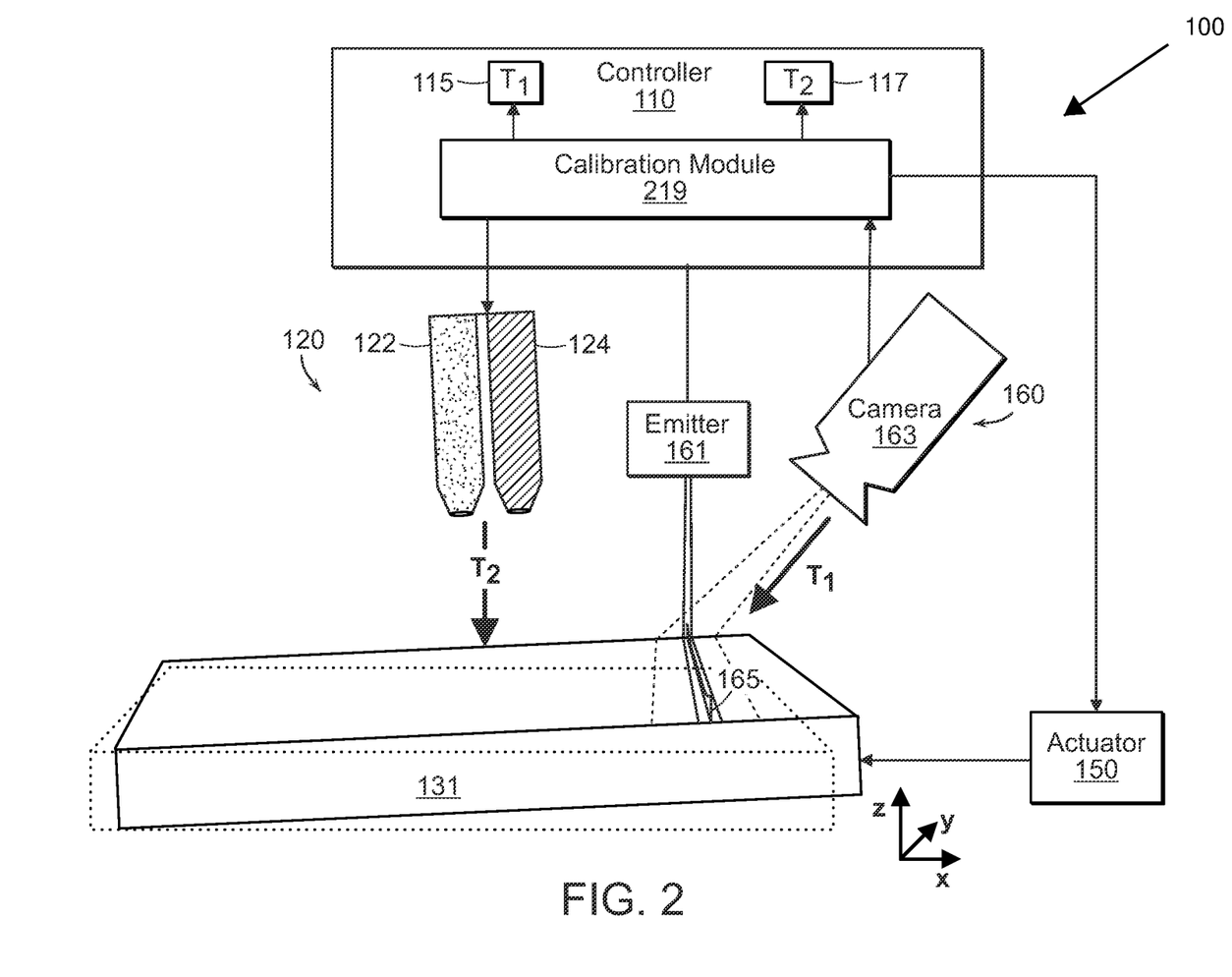
FIG. 2 is a calibration configuration of the additive fabrication system of FIG. 1.

Referring to FIG. 2, in the calibration configuration, the controller 110 is configured with a calibration module that controls the scanner 160, the jets 120, and a calibration platform 131 to determine the first calibration transform, $T_1$ 115 and the second calibration transform, $T_2$ 117 that characterize the geometric misalignments and distortions between the components of the printer 100. The calibration platform includes fiducial marks that can be detected by the scanner, for example, with a relief (e.g., with etched depressions and/or raised portions on a precise planar surface) checkerboard or crosshatching with precise spacing, for example, forming precise 1 cm by 1 cm squares with 90 degree corners. Generally, these fiducial marks are detected using the scanner, and are used to determine a transformation from scanner data to an orthogonal coordinate system defined by the calibration platform. In general, the calibration platform is not intended for operational fabrication of parts, and is rather intended to be used to calibrate the system, at which point it may be removed and replaced with a platform 130 on which a desired object is fabricated.

3.1 First Calibration Transform

The first calibration transform, $T_1$ 115 maps the three-dimensional (3D) coordinate system, $X_S$ associated with the scanner 160 to a calibration plate coordinate system, $X_P$ 221 (e.g., a 3D Cartesian coordinate system associated with the calibration platform 130, where units are specified in millimeters or inches). This mapping is represented as:

$$T_1: X_S \rightarrow X_P$$

or $$T_1: (x_s, y_s, z_s) \rightarrow (x_P, y_P, z_P)$$

Figure 3A:
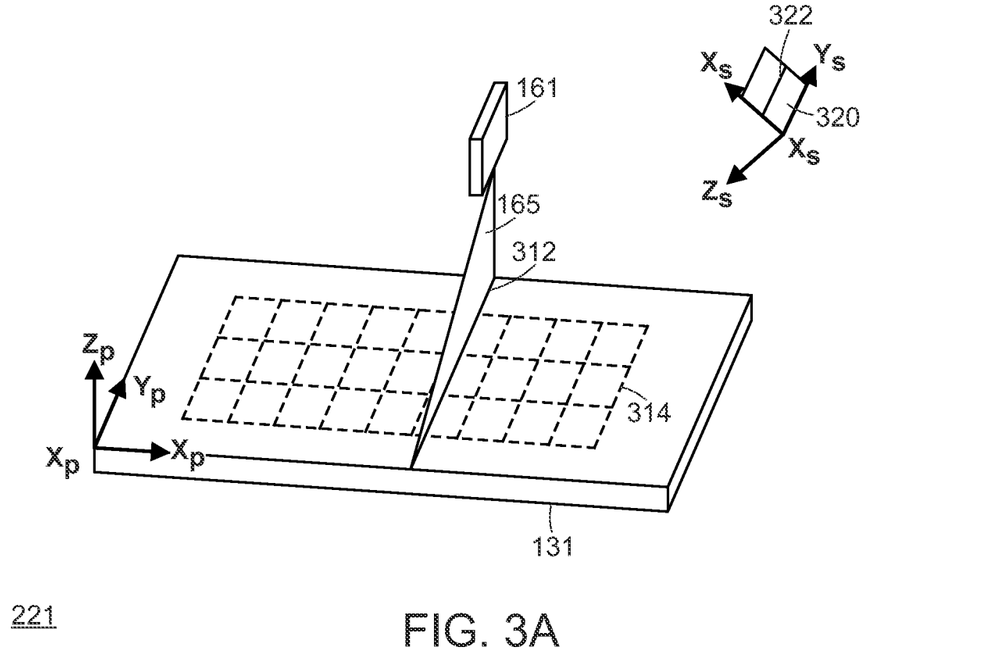
FIG. 3A is an illustration of a relationship of a scanner coordinate system to a calibration plate coordinate system.
Figure 3B:
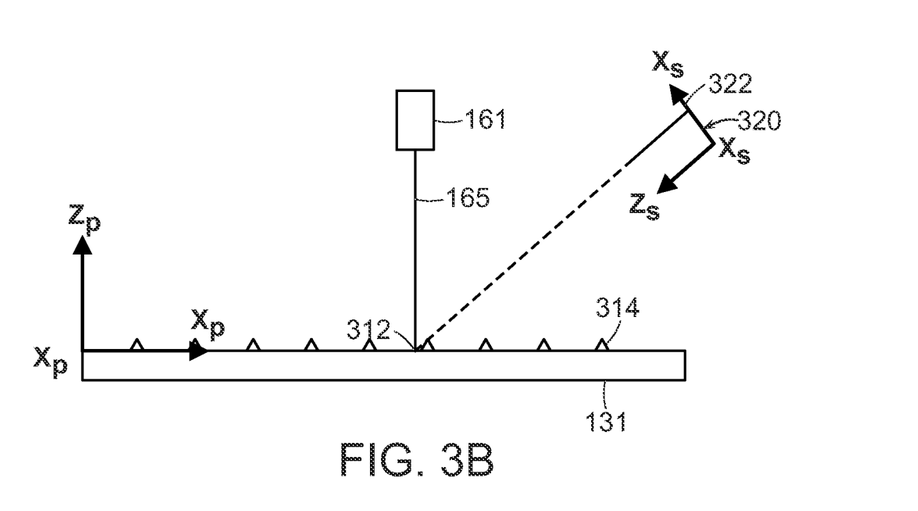
FIG. 3B is a cross-sectional side view of FIG. 3A.

Referring to FIGS. 3A-B, the relationship of these coordinate systems is illustrated with reference of a calibration plate 131, in the type of scanner implementation that uses a camera to detect incident light on an object using a profilometry approach. The orthogonal plate coordinate system $X_P$ is shown to be aligned with the calibration plate 131, and in this example, the $x_P$ and $y_P$ directions being aligned with fiducial marks 314 on the plate. The scanner coordinate system $X_S$ is shown with the $z_S$ direction extending from the scanner to toward the calibration plate in the direction of the intersection 312 of illumination 165 and the plate. In the case of profilometry, the $x_S$, $y_S$ plane corresponds to the plane of the imaging sensor of the camera, and the intersection 312 corresponds to a (not necessarily straight) line 322 in the plane of the imaging sensor. (Note that for illustration, the $z_S$ direction is shown in the cross-section of FIG. 3B in the $x_P$, $z_P$ plane and the illumination 165 shown in the $y_P$, z+P plane, but this is not in general the case.)

The first calibration transform, $T_1$ 115 is modeled as a sequential application of a non-linear transform $T_{NL}$ followed by the application of the affine transform $T_A$ as follows:

$$T_1 = T_A \circ T_{NL}$$

In the discussion below, a "linear" transformation or function includes transformations that are "straight-line" transformation, which may be represented in matrix form as y=Ax or y=Ax+b, with the latter type of transformation being referred to as an "affine" function of transformation. In the discussion below, transformations are referred to as "affine" to emphasize that in general b≠0. Furthermore, a function of transformation is referred to as "nonlinear" if it is not, in general, representable in such a linear form (whether or not b is zero).

Thus, we have the mapping $T_{NL}$, which maps points in the scanner coordinate system to the calibrated scanner coordinate system where the nonlinear distortions are removed:

$$T_{NL}: X_S \rightarrow X_{CS}$$

or $$T_{NL}: (x_S, y_S, z_S) \rightarrow (x_{CS}, y_{CS}, z_{CS}).$$

We also have the mapping $T_A$ which maps the points in the calibrated scanner coordinate system and the calibration plate coordinate system:

$$T_A: X_{CS} \rightarrow X_P$$

or $$T_A: (x_{CS}, y_{CS}, z_{CS}) \rightarrow (x_P, y_P, z_P).$$

In the example of FIG. 2, the affine transform, $T_A$ is due, for example, to a rotation, scale (e.g., change between pixels and metric measurements), shear, and translation of the calibration plate platform 130 relative to the scanner 160 (as is illustrated in the figure). The affine transform, $T_A$ can be represented as a transform as follows:

$$\begin{bmatrix} x_P \\ y_P \\ z_P \end{bmatrix} = \begin{bmatrix} u_1 & u_2 & u_3 \\ u_4 & u_5 & u_6 \\ u_7 & u_8 & u_9 \end{bmatrix} \begin{bmatrix} x_{CS} \\ y_{CS} \\ z_{CS} \end{bmatrix} + \begin{bmatrix} u_{10} \\ u_{11} \\ u_{12} \end{bmatrix}$$

where the extent of the rotation, translation, shear, and scale between the calibration plate platform 130 and the scanner is represented in transform parameters $u_1 \ldots u_{12}$. If we assume that the origin of the coordinate systems are the same then the translation vector $[u_{10}, u_{11}, u_{12}]$ is set to zero.

The nonlinear transform, $T_{NL}$, is due, for example, to lens distortion in the emitter 161, the camera 163, and/or other components of the scanner 160. For the triangulation-based profilometer type of scanner described above, the profilometer acquires a depth profile for a line along the y-axis referred to as a "scanline"). If the scanner 160 were free of nonlinear distortion, then a depth profile acquired for a flat object such as the calibration plate platform 130 would be planar. But in the presence of nonlinear distortion, when the scanner 160 scans a region of a flat object such as the calibration plate platform 130, a curved, non-planar depth profile 165 (as is shown in the figure) is sensed.

In some examples, the nonlinear transform, $T_{NL}$ is modeled using a low-degree polynomial function with parameters, v as follows: $T_{NL}$:

$$x_{CS} = x_S + (x_S - v_1)(v_2 r^2 + v_3 r^4)$$
$$y_{CS} = y_S + (y_S - v_4)(v_2 r^2 + v_3 r^4)$$
$$z_{CS} = z_S + v_5 y_S^2 + v_6 y_S + v_7 x_S^2 + v_8 x_S + v_9 x_S y_S + v_{10}$$
$$\text{where } r = \sqrt{(x_S - v_1)^2 + (y_S - v_4)^2}$$

In other examples, higher degree polynomials or ratios of polynomials are used. It is noted that the model for $T_{NL}$ above assumes that there is distortion in the direction along the x-axis, y-axis, z-axis. In some instances, there might not be any distortions along one of the axis, for example, the x-axis. As such, nonlinear distortion is computed using and for the y and z coordinates and does not depend on the x coordinate (e.g., $x_{CS}=x_S$, $y_{CS}=g(y_S)$, $z_{CS}=h(y_S,z_S)$). It is also noted that the distortion function can be set to be independent of $z_S$ (as above), but it can also depend on the value of $z_S$ (e.g., $z_{CS}=f(x_S, y_S, z_S)$).

It is noted that, in some examples, the transform, $T_1$ is computed in separate stages. For example, the nonlinear portion $T_{NL}$ of the transform $T_1$, may be computed first. The nonlinear transform is then applied to scan data to generate a representation of the scan data that is used to determine the affine transform, $T_A$. More generally, the affine transform, $T_A$ can be split into any number of other sub-transformations (e.g., scale, rotations, shear, translations) and these transformations can be estimated separately.

3.1.1 Concurrent Parameter Estimation

In some examples, the parameters $u_1, \ldots, u_{12}$ of $T_A$ and the polynomial parameters $v, \ldots, v_{10}$ of $T_{NL}$ are estimated based on correspondences. For example, if the geometry of the calibration plate platform 130 is known, the calibration plate platform 130 is scanned using the scanner 160. After scanning, a set of corresponding points in the coordinate system of the scanner 160 and in the calibration plate coordinate system (e.g., the physical coordinate system of the calibration plate 130) are extracted.

The set of points in the coordinate system of the scanner 160 are referred to as:

$$P=\{(x_1,y_1,z_1), \ldots, (x_n,y_n,z_n)\}$$

and the set of corresponding points in the calibration plate coordinate system are referred to as:

$$P'=\{(x'_1,y'_1,z'_1), \ldots, (x'_n,y'_n,z'_n)\}.$$

In some examples, the corresponding points in the calibration plate coordinate system are acquired by identifying distinct fiducial points (e.g., grid marks) that are present on the calibration platform 130 (or another calibration target with known geometry and distinct fiducial points). When using a relatively flat object for calibration such as the calibration platform 130, a larger depth range can be artificially generated by moving the calibration plate up/down with respect to the scanner 160 while scanning the calibration platform 130.

In one example, the parameters u and v of $T_A$ and $T_{NL}$ are estimated concurrently using an optimization/parameter fitting process. For example, optimized parameters u* and v* are computed according to the following equation:

$$u^*, v^* = \underset{u,v}{\arg\min} \sum_{i=1}^{n} \text{Loss}(T_A^u \circ T_{NL}^v((x_i, y_i, z_i)) - (x'_i, y'_i, z'_i))$$

where the loss is, for example, an absolute value or squared value. An optimal set of parameters u* and v* are computed using one of a variety of optimization methods including gradient descent or stochastic gradient descent methods.

3.1.2 Serial Parameter Estimation

In another example, the parameters, v of $T_{NL}$ are estimated first and then the parameters u of $T_A$ are estimated with the parameters, v of $T_{NL}$ fixed.

For example, the calibration plate platform 130 is scanned using the scanner 160. After scanning, a set of corresponding points in the coordinate system of the scanner 160 and in the calibration plate coordinate system (e.g., the physical coordinate system of the calibration platform 130) are extracted.

The set of points in the coordinate system of the scanner 160 are referred to as:

$$P=\{(x_1,y_1,z_1), \ldots, (x_n,y_n,z_n)\}$$

and the set of corresponding points in the calibration plate coordinate system are referred to as:

$$P'=\{(x'_1,y'_1,z'_1), \ldots, (x'_n,y'_n,z'_n)\}.$$

Because the flat platform was scanned, for all points $P'_i=(x'_i, y'_i, z'_i)$ in the calibration plate coordinate system, $z'_i$ has the same value. However, in the scanner's coordinate system, at least some points $P_i=(x_i, y_i, z_i)$ will have different values of $z_i$ due to nonlinear distortion.

The optimized parameters, v* of $T_{NL}$ can be estimated by solving a linear system using points P and P'. For example, each point on a flat region $(x_i, y_i, z_i)$ can provide one linear equation:

$$v_5 y_i^2 + v_6 y_i + v_7 x_i^2 + v_8 x_i + v_9 x_i y_i + v_{10} = 0.$$

Once the optimized parameters, v* of $T_{NL}$ are estimated, the set of points in the coordinate system of the scanner 160, P are transformed by $T_{NL}$ (configured according to parameters, v*) to generate a transformed set of points, P" as follows:

$$P''=T_{NL}^{v^*}(P).$$

In some examples, the transformed set of points, P″ and the set of corresponding points in the calibration plate platform coordinate system, P′ are then used to estimate an optimized set of parameters u* of $T_{L1}$ as follows:

$$u^* = \underset{u}{\operatorname{argmin}} \sum_{i=1}^{n} \operatorname{Loss}(T_A^u((x_i'', y_i'', z_i'')) - (x_i', y_i', z_i')),$$

where the loss is, for example, an absolute value or squared value. An optimal set of parameters u* is computed using one of a variety of optimization methods including gradient descent or stochastic gradient descent methods.

3.1.3 Multiple Scanners

In some examples (e.g., when a single scanner is unable to span the entire printing platform), the printer includes multiple scanners. The first calibration transform, $T_1$ is computed individually for each of the scanners. When using multiple scanners, the scanning volume of neighboring scanners typically have some amount of overlap. In general, each scanner has its own calibration transform, $T_1$. The calibration process for multiple scanners works in a similar way to the process described above for calibrating a single scanner in that it estimates the transform from each scanner's coordinate system to the calibration plate (e.g., calibration platform) coordinate system. In general, the physical calibration target (e.g., the calibration platform) and the corresponding points P′ should span the multiple scanners.

3.1.4 Motion System

In some examples motion system's coordinate system might be not aligned with the coordinate system of the calibration plate. In some cases, motion's system axes might not be orthogonal to each other. Due to the mounting of the calibration plate with respect to the motion system, the axes can be possibly misaligned (e.g., the calibration plate can have a tilt with respect to the motion system. Thus, it is often necessary to recover the motion axes with respect to the calibration plate coordinate system.

We define vector $X_m = (x_{xm}, y_{xm}, z_{xm})$ to denote the motion vector of the X-motion axis. Similarly, we define vectors $Y_m = (x_{ym}, y_{ym}, z_{ym})$ and $Z_m = (x_{zm}, y_{zm}, z_{zm})$ for Y-motion axis and Z-motion axis, respectively.

One method to estimate $X_m$, is to move the calibration plate by a fixed distance dx along the X-motion axis $X_m$ and capture the corresponding 3D points on the calibration plate. The set of points in the coordinate system of the scanner 160 are referred to as:

$$P = \{(x_1, y_1, z_1), \ldots, (x_n, y_n, z_n)\}$$

and the set of corresponding points in the calibration plate coordinate system are referred to as:

$$P' = \{(x_1', y_1', z_1'), \ldots, (x_n', y_n', z_n')\}.$$

The additional set of points in the coordinate system of the scanner 160 after moving the calibration plate by $dx * X_m$, are referred to as:

$$P_{dx} = \{(x_1^{Xm}, y_1^{Xm}, z_1^{Xm}), \ldots, (x_n^{Xm}, y_n^{Xm}, z_n^{Xm})\}$$

Figure 4A:
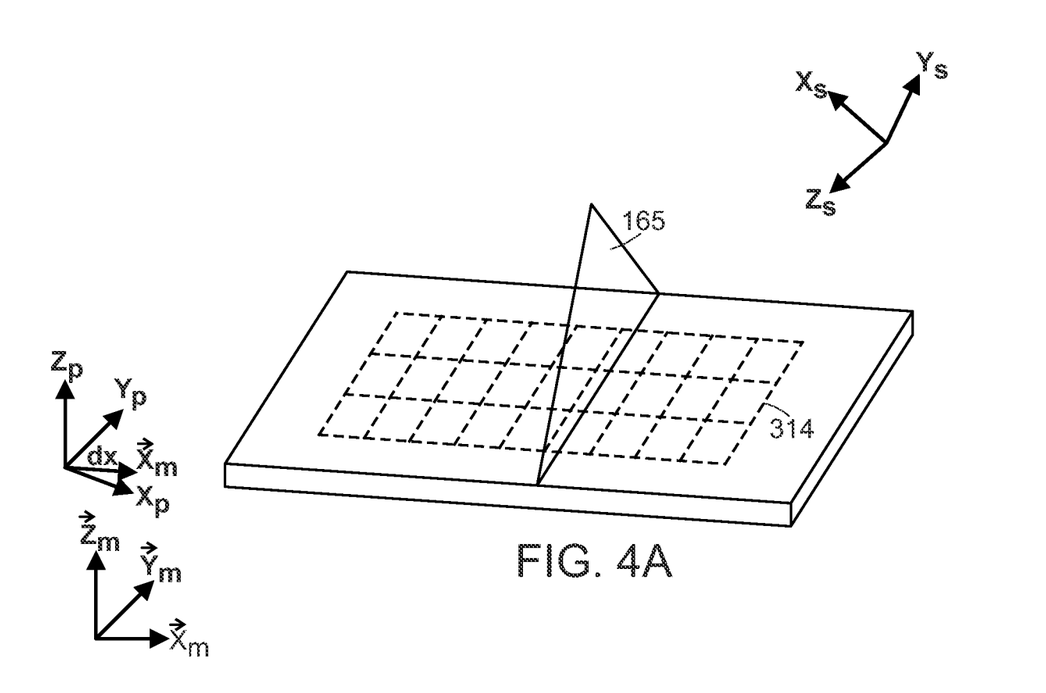
FIG. 4A is an illustration of scanning of a displaced calibration plate.
Figure 4B:
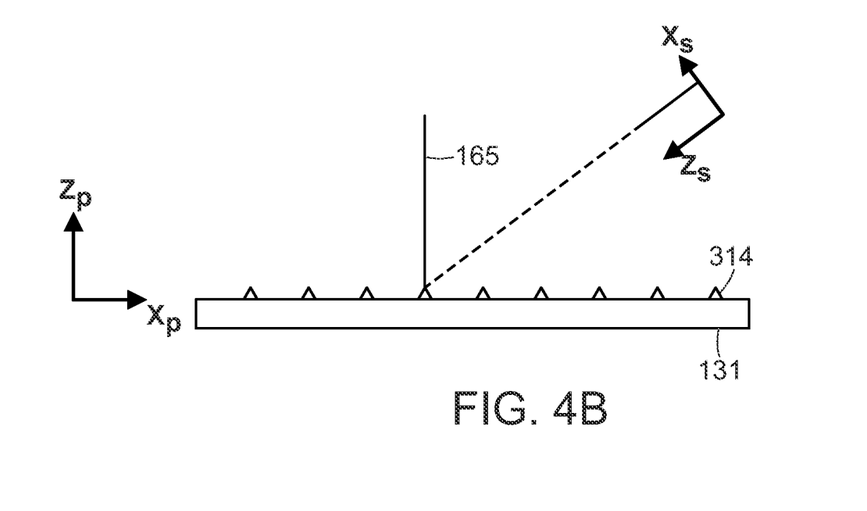
FIG. 4B is a cross-sectional side view of FIG. 4A.

Referring to FIGS. 4A-B, a displacement of the calibration plate 131 by the vector $dx * X_m$ is illustrated and points along the intersection of the illumination plane 165 are included in $P_{dx}$, for example, with a raised fiducial at a known location on the plate on that intersection. Note that many different displacements, generally with different combinations of displacement amounts in the $X_m$, $Y_m$, and $Z_m$ directions are used, recognizing that for each displacement only some fiducial marks (or none) may be acquired by the scanner, but in combination a sufficient number of scans of the fiducial marks are acquired to calibrate the motion system.

In one example, the parameters $X_m$, are estimated using an optimization/parameter fitting process. For example, optimized parameters $X^*_m$ are computed according to the following equation:

$$X_m^* = \underset{X_m}{\operatorname{argmin}} \sum_{i=1}^{n} \operatorname{Loss}(T_A \circ T_{NL}((x_i^{Xm}, y_i^{Xm}, z_i^{Xm})) - (x_i', y_i', z_i') + dx * X_m)$$

In another example, the parameters u and v of $T_A$ and $T_{NL}$ and the parameters $X_m$, are estimated using an optimization/parameter fitting process. For example, optimized parameters u*, v*, $X^*_m$ are computed according to the following equation:

$$u^*, v^*, X_m^* =$$

$$\underset{u,v,X_m}{\arg \min} \sum_{i=1}^{n} \operatorname{Loss}(T_A^u \circ T_{NL}^v((x_i^{Xm}, y_i^{Xm}, z_i^{Xm})) - (x_i', y_i', z_i') + dx * X_m) +$$

$$\sum_{i=1}^{n} \operatorname{Loss}(T_A^u \circ T_{NL}^v((x_i, y_i, z_i)) - (x_i', y_i', z_i')).$$

In a similar manner, motion axis $Y_m$, can be estimated. The additional set of points in the coordinate system of the scanner 160 after moving the calibration plate by $dy * Y_m$, are denoted as:

$$P_{dy} = \{(x_1^{Ym}, y_1^{Ym}, z_1^{Ym}), \ldots, (x_n^{Ym}, y_n^{Ym}, z_n^{Ym})\}$$

In a similar manner, motion axis $Z_m$, can be estimated. The additional set of points in the coordinate system of the scanner 160 after moving the calibration plate by $dz * Z_m$, are denoted as:

$$P_{dz} = \{(x_1^{Zm}, y_1^{Zm}, z_1^{Zm}), \ldots, (x_n^{Zm}, y_n^{Zm}, z_n^{Zm})\}.$$

The optimization process can proceed in an analogous manner as above after estimating u* and v*, or parameters u, v, $X_m$, $Y_m$, $Z_m$ can be estimated in a single optimization process.

In some examples, X-motion axis can be the same as the 3D scanner motion axis. In this case, computing $X_m$, is equivalent to transforming the [1,0,0] vector expressed in the 3D scanner system to the calibration plate coordinate system and scaling it appropriately.

An alternative method to estimate one of the motion axes expressed in the calibration plate coordinate system, for example, $Z_m$, is to estimate $X_m$, $Y_m$ using methods described above and also to measure/estimate motion axes $X'_m$, $Y'_m$, $Z'_m$ in some other coordinate system. Then $Z_m$, can be computed from $X'_m$, $Y'_m$, $Z'_m$, $X_m$, $Y_m$.

3.2 Second Calibration Transform

The second calibration transform, $T_2$ 117 maps the two-dimensional (2D) coordinate system, $X_H$ associated with the jets 120 to the physical units of the calibration plate coordinate system, $X_P$ 221. Very generally, the second calibration transform, $T_2$ 117 represents a distortion imparted to a 2D pattern printed on the calibration plate platform 130 by the jets 120.

Figure 5A:
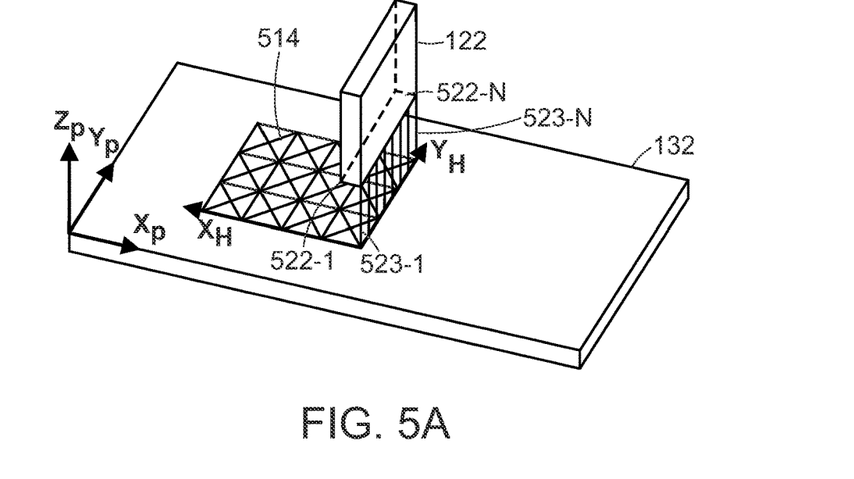
FIG. 5A is an illustration of a printhead calibration process.
Figure 5B:
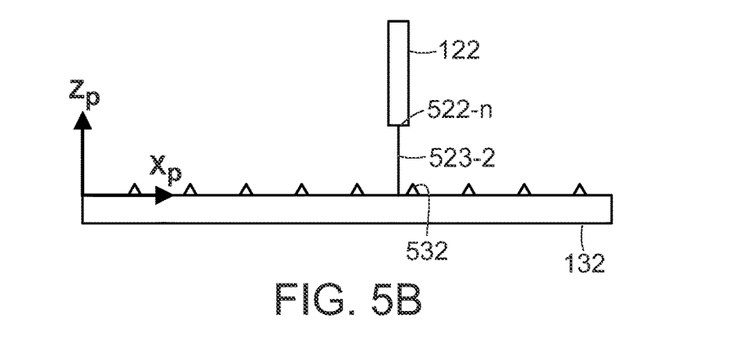
FIG. 5B is a cross-sectional side view of FIG. 5A.
Figure 5C:
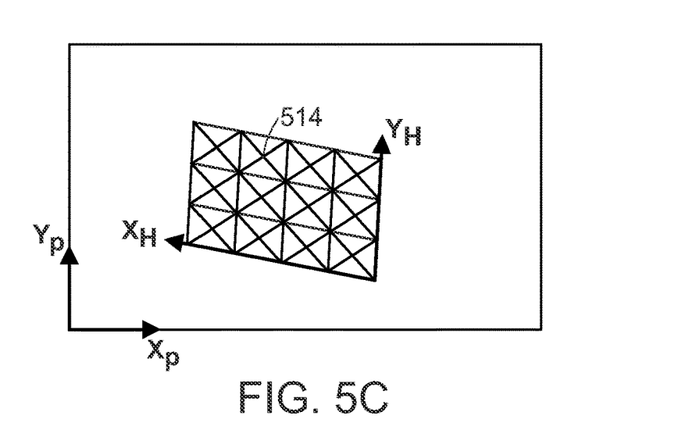
FIG. 5C is a top view of FIG. 5A.

Referring to FIGS. 5A-C, generally, a printhead 122 (i.e., one of typically multiple printheads for the same or different materials mounted in fixed relation to one another) is positioned above a platform 132 (e.g., build platform 130 or calibration platform 131) and the printhead is used to print a reference pattern 514 on the platform. The printhead is situated generally oriented in the $Y_P$ direction, with a series of equally-spaced nozzles 522-1 through 522-N along that direction. The pattern is deposited with ink trajectories 523-1 through 523-N onto the plate 132 is moved along then $X_m$ direction by incrementing the motion system in the X direction, and the printhead deposits the defined pattern at equal known increments of motion (e.g., based on a motion encoder that signals each incremental distance). The resulting pattern 514 is deposited on the plate, such that the variation along the nozzle direction is in a $Y_H$ direction on the plate, and variation along the motion direction is along the $X_H$ direction on the plate, which is not necessarily orthogonal to $Y_H$, resulting, for example, with a skewed pattern as illustrated in FIG. 5C.

Figure 6A:
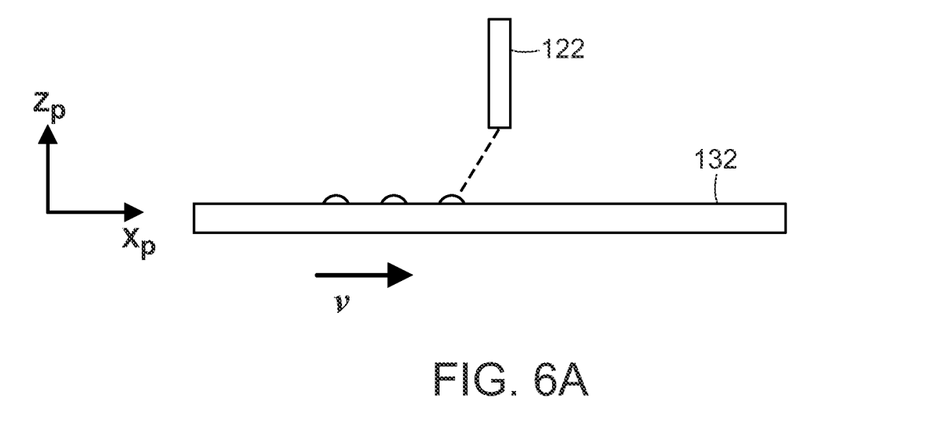
FIGS. 6A-B are side views of jetting on moving plates.
Figure 6B:
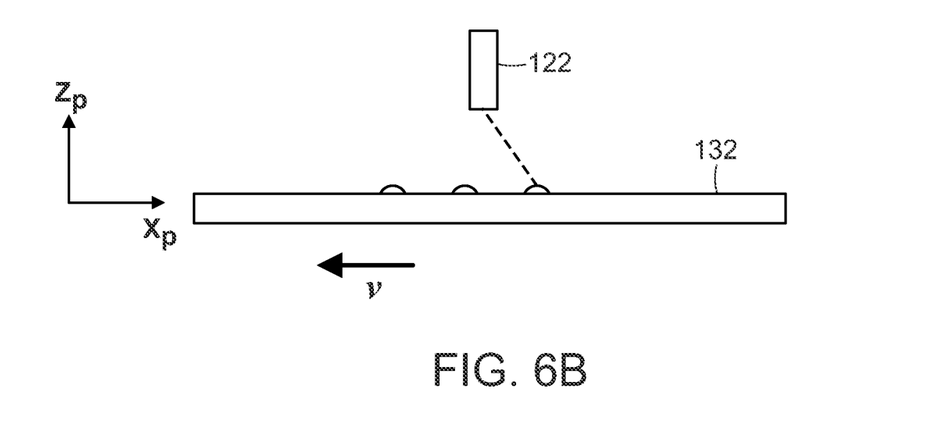

Note that the situation may be more complex than shown in FIGS. 5A-C. For example, because of the continuous motion of the plate relative to the printhead, and the time it takes for an ink drop to travel from the nozzle to the plate surface, there is an offset that depends on the height of the printhead above the surface being printed on (e.g., the plate or a previously printed layer) as well as the velocity of the plate. Referring to FIG. 6A, in a situation in which the plate is moving from left to right in the figure, the locations of the ink landing on the plate are effectively offset to the left relative to the printhead. Conversely, as shown in FIG. 6B, when the plate is moving from right to left, the ink locations are effectively offset to the right. Furthermore, if the printhead height is increased, the amount of the offset increases. Therefore, the calibration described below is specific to a printhead, the height of a reference location (e.g., a particular point on the assembly of printheads) on the printhead, and the velocity of the plate when printing. Furthermore, the process described below for one printhead is generally performed independently for each of the printheads, which are not necessarily precisely positioned or oriented with respect to one another. Furthermore, not illustrated is the effect of tilt of the surface being printed upon. To the extent that there is a change in height as the plate moves (i.e., $x_p$ and $x_m$ are not exactly aligned, causing the plate to be tilted with respect to the motion system), such a variation is effectively taken into account in the calibration described below and the transformation depends on the slope of the build surface. The second calibration transform, $T_2$ 117 is represented as:

$$T_2: X_H \rightarrow X_P$$

or $$T_2: (x_H, y_H) \rightarrow (x_P, y_P).$$

In general, both $T_2$ and its inverse $T_2^{-1}$ are used in the system, so $T_2$ is specified to be invertible. To determine $T_2$, each jet or set of jets 120 is provided with a known 2D calibration pattern (e.g., a grid, a set of circular patterns, crosses) specified in the 2D coordinate system of the jets 120. In general, the 2D calibration pattern is selected such that its key points/fiducial points can be reliably estimated using image/depth processing algorithms.

The jets 120 print the known 2D calibration pattern on the calibration platform 130. The 2D calibration pattern is represented as a set of points in the coordinate system of the jets 120 as follows:

$$P^* = \{(x^*_1, y^*_1), \ldots, (x^*_n, y^*_n)\}$$

and the set of corresponding points in the calibration plate coordinate system are referred to as:

$$P' = \{(x'_1, y'_1, z'_1), \ldots, (x'_m, y'_m, z'_m)\}.$$

To obtain, P', the scanner 160 scans the calibration pattern printed on the calibration plate platform 130 and the $T_1$ transform is applied to the resulting scan data to map the scan data to the calibration plate platform coordinate system. P' is then processed to identify points corresponding to fiducial points of the 2D calibration pattern (e.g., intersections of lines in a grid pattern, centers of circular patterns). The z' coordinate in the P' set of coordinates can be discarded because the $T_2$ transform is a 2D transform. However, in general, different transforms $T_2$ can be computed for different values of the z' coordinate.

The correspondences between the points in P* and P' are used to compute the second calibration transform, $T_2$ 117 and its inverse. Many different transform types are possible and transforms that use a small number of parameters generally work well. In one example, the second calibration transform, $T_2$ is represented as the following transform:

$$\begin{bmatrix} x_P \\ y_P \end{bmatrix} = \begin{bmatrix} s_1 & s_2 \\ s_3 & s_4 \end{bmatrix} \begin{bmatrix} x_H \\ y_H \end{bmatrix} + \begin{bmatrix} s_5 \\ s_6 \end{bmatrix}$$

where the extent of the rotation, scaling, skew, and translation between the calibration plate platform 130 and the jets 120 is represented using transform parameters $s_1, \ldots, s_6$. Using a straightforward numerical manipulation, it is possible to obtain $T_2^{-1}$.

In some examples, P* and the set of corresponding points in the calibration plate platform coordinate system, P' are then used to estimate an optimized set of parameters u* of $T_2$ as follows:

$$s^* = \underset{s}{\operatorname{argmin}} \sum_{i=1}^{n} \operatorname{Loss}(T_2^s((x_i^*, y_i^*)) - (x'_i, y'_i)).$$

where the loss is, for example, an absolute value or squared value. An optimal set of parameters s* is computed using one of a variety of optimization methods including gradient descent or stochastic gradient descent methods.

In some examples, the parameters for the second calibration transform $T_2$ 117 are different for different configurations of the printheads/jets. For example, different parameterizations of the second calibration transform $T_2$ 117 can be used for different print speeds or for different distances between the printheads/jets from the build platform (e.g., for the inkjet printing process droplet's velocity has both vertical and horizontal components and both these velocities and the distance to the build platform determine the location of the deposited droplets). At runtime, the printer selects the appropriate parameterization of the second calibration transform $T_2$ 117 based on print process. In some examples, transforms for intermediate values are determined by interpolating between neighboring transforms.

In general, the calibration plate platform that is used to estimate $T_1$ might be different than the calibration plate to estimate $T_2$. These plates might be also different than the plate on which parts are built. Each of these plates might be tilted and rotated slightly differently with respect to the motion system. When estimating transform $T_2$ it might be beneficial to print a raft before printing the calibration pattern. This raft can be printed to match the depth/geometry of the calibration plate that is used to estimate transform $T_1$. It is also possible to print a raft such that the raft matches a default orientation and distance to the printheads when parts are printed in a default configuration. For example, the raft might be printed at a particular distance $d_p$ from the printheads and such that the orientation is perpendicular $Z_M$ motion axis.

3.3 Multiple Printheads

In general, different printheads will have a different transform $T_2$ and each of them needs to be estimated. This is done by printing calibration target for each printhead independently, 3D scanning the printed calibration target, computing the correspondences between layer fiducial points and its physical locations and computing $T_2$ for each printhead. Note that multiple scanners might be used here in the process (e.g., for scanning the printed calibration target).

4 Use Cases

In general, the calibration techniques described herein are applicable to a number of applications, including but not limited to conventional additive manufacturing, visualization of print data, printing with a digital feedback loop, and machine learning-based corrections of repeatable errors.

4.1 Conventional Additive Manufacturing

For conventional additive manufacturing, no scanner is used during the print process for the parts. However, the scanning system can be used to align different printheads to a common coordinate system and to compute the axis of the motion system in order to ensure that both measurements of the printed parts and the angles are preserved. In order to do this, the scanning system is used to estimate transforms $T_1$, $T_2$, and axes $X_m$, $Y_m$, $Z_m$.

The model data (a virtual representation of object(s) to be printed) is represented in its own coordinate system $X_t$, $Y_t$, $Z_t$ called model coordinate system. This coordinate system is typically orthonormal and uses physical units (or voxels of a known size). The model data is usually discretized/voxelized. Next, the model data is transformed to the build coordinate system defined using axes $X_b$, $Y_b$, $Z_b$ (and an origin). The build coordinate system is associated with an orthogonal system in which a physical part (or parts are being manufactured). For simplicity, the centers of the model coordinate system, the motion coordinate system, the build coordinate system, and the calibration plate coordinate system are the same (or there is a known determined offset/translation between them). There are a few choices for the build coordinate system. In one instance the build coordinate system can be exactly the same as the calibration coordinate system. In another instance, $Z_b$ axis and $Z_m$ axes can be aligned (e.g., their directions can be the same), and $X_b$ can be in the plane defined by $X_m$ and $Z_m$ (and $Y_b$ is orthogonal to both $X_b$ and $Z_b$). There are other possible ways to define the build coordinate system.

Each layer to be printed (e.g., that is sent to the printer) needs to be computed. Each volume element in the layer (e.g., a pixel in a bitmap), is mapped back to the model data coordinate system using $T_2^{-1}$, where it is determined which material type or no-material it should contain. Doing so "predistorts" the model data before it is sent to the printhead/jet. The printhead/jet prints the model data and, in doing so, undoes the predistortion of the model data, resulting in an accurately printed object. In the context of FIG. 1, this predistortion is performed in the model data adjustment module 113. For this process to work well the right $T_2^{-1}$ transform needs to be used. In general, the configuration of the printhead and plate needs to be close to the configuration of when the $T_2$ is computed. In one possible setting, the raft is printed to make sure that at a particular distance $d_p$ from the printheads and such that its orientation is perpendicular $Z_M$ motion axis (if the $Z_M$ axis is used to determine the 4 axis). Scanning can be used to determine the initial orientation/tilt of the build platform and distance to the printheads.

In some other implementation, it is possible to map the volumetric data of a slice in model coordinate system to the motion coordinate system (or calibration plate coordinate system) using transformation $T_2$ and then reconstruct the bitmap to be sent to the printhead from these transformed elements.

In some examples, a different transform is performed for each material type/jet (i.e., when using a printer that prints different materials from different jets/heads). In the case that there are multiple jets/printheads corresponding to the same material type, then typically one (or two) corresponding transforms are used to transform the coordinates to the valid print range in the printhead coordinate system. The printhead/jet for printing each discrete element/voxel is then selected based on the transform used. If multiple transforms work that we can select one of them. There are many possible strategies on which printhead to select in this case.

4.2 Print Data Visualization

In other examples, an object is printed using the process described in the above section and the object is scanned during the print process (e.g., the object is scanned after each layer is printed). The first calibration transform, $T_1$ is then used to map the scan data to the coordinate system of the calibration plate 130. Then, the data can be also mapped to the coordinate system of the model. The mapped scan data is then resampled onto a regular (e.g., voxel) grid. In the context of FIG. 1, mapping of the scan data is performed in the scanner data adjustment module 111.

4.3 Printing with a Digital Feedback Loop

In some examples, the print process is performed as is described in the sections above, and the scans of the objects/parts on the build platform are compared to the model data (e.g., in the calibration plate coordinate system or in the model coordinate system). The planner analyzes this data stream and makes corrections to the next printing layers.

4.4 Corrections of Repetitive Errors

In some examples, the print data (e.g., a sequence of 3D scans of the printed object) in the calibration plate coordinate system or the model coordinate system is assembled to obtain a final 3D/volumetric structure of the printed object. The $T_2^{-1}$ transform is also performed on each scan layer and expected layer thickness to compute an analogous 3D/volumetric representation of the input model also in the calibration plate coordinate system (or in the model coordinate system). Both representations are in the same coordinate system: we have a 3D/volumetric input model and also a 3D volumetric model that was printed by the machine. These two representations can be used by supervised machine learning algorithms to compute a virtual simulation of the printing process and a print-inverse of the printing process (that allows correcting repetitive print errors).

5 Implementations

The printer shown in FIG. 1 is only an example, and other printer arrangements that may be used are described for example, in U.S. Pat. No. 10,252,466, "Systems and methods of machine vision assisted additive fabrication," U.S. Pat. No. 10,456,984, "Adaptive material deposition for additive manufacturing," U.S. Pat. Pub. 2018/0056582, "System, Devices, and Methods for Inkjet-Based Three-Dimensional Printing," as well as in Sitthi-Amorn et al. "MultiFab: a machine vision assisted platform for multi-material 3D printing." *ACM Transactions on Graphics (TOG)* 34, no. 4 (2015): 129. The above-described estimation of depth data may be integrated into the feedback control process described in co-pending U.S. Pat. Pub. 2016/0023403 and 2018/0169953. All of the aforementioned documents are incorporated herein by reference An additive manufacturing system typically has the following components: a controller assembly is typically a computer with processor, memory, storage, network, IO, and display. It runs a processing program. The processing program can also read and write data. The controller assembly effectively controls the manufacturing hardware. It also has access to sensors (e.g., 3D scanners, cameras, IMUs, accelerometers, etc.).

More generally, the approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for additive fabrication, comprising:
    sensing a first object using an imaging device of an additive fabrication system to determine sensed spatial characteristics of the first object represented in a first coordinate system;
    determining first numerical configuration information, including determining a relationship between the first coordinate system and a common coordinate system from a relationship of known spatial characteristics of the first object and the sensed spatial characteristics of the first object, the first numerical configuration information including a representation of a nonlinear relationship between the known spatial characteristics of the first object and the sensed spatial characteristics of the first object;
    fabricating a second object on a build platform of the additive fabrication system, including operating a printhead assembly of the additive fabrication system to deposit material forming the second object to have one or more known spatial characteristics represented in a second coordinate system;
    sensing the second object after fabrication using the imaging device configured according to the first numerical configuration information to determine sensed spatial characteristics of the second object represented in the common coordinate system;
    determining second numerical configuration information, including determining a relationship between the second coordinate system and the common coordinate system from a relationship of the known spatial characteristics of the second object and the sensed spatial characteristics of the second object in the common coordinate system; and
    configuring the additive fabrication system using one or both of the first numerical configuration information and the second numerical configuration information for fabrication of one or more objects according to models of said objects.

2. The method of claim 1 further comprising fabricating a third object on a second build platform using the configured additive fabrication system.

3. The method of claim 1, wherein the first object includes the build platform.

4. The method of claim 1, wherein the first object includes calibration pattern.

5. The method of claim 4 wherein the calibration pattern includes a grid pattern.

6. The method of claim 1, wherein the known spatial characteristics of the second object comprise a known three-dimensional structure.

7. The method of claim 6, wherein the known three-dimensional structure comprises a grid structure.

8. The method of claim 1 wherein the common coordinate system is a physical coordinate system.

9. The method of claim 1, wherein determining the first numerical configuration information includes determining a representation of a spatial mapping between the first coordinate system and the common coordinate system.

10. The method of claim 9, wherein determining the representation of the spatial mapping comprises determining an affine transformation.

11. The method of claim 9, wherein determining the representation of the spatial mapping comprises determining at least one of a relative position and a relative orientation of the first object and the imaging device.

12. The method of claim 1, wherein the printhead assembly includes a plurality of printheads, and wherein determining the second numerical configuration information, includes determining relationships between the common coordinate system and coordinate systems associated with respective printheads of the printhead assembly.

13. The method of claim 1, wherein the imaging device includes a plurality of imaging devices, and wherein determining the first numerical configuration information, includes determining relationships between the common coordinate system and coordinate systems associated with respective printheads of the printhead assembly.

14. The method of claim 1 wherein determining the second numerical configuration information further includes determining directions of controllable relative motion of the build platform and the printhead assembly.

15. The method of claim 14 wherein fabricating the second object includes controlling the relative motion of the build platform relative to the printhead assembly according to the determined directions.

\* \* \* \* \*